United States Patent [19]
Sykes

[11] Patent Number: 4,470,613
[45] Date of Patent: Sep. 11, 1984

[54] TRACTOR HITCHES

[75] Inventor: Alec Sykes, Huddersfield, England

[73] Assignee: David Brown Tractors Ltd., Huddersfield, England

[21] Appl. No.: 442,321

[22] Filed: Nov. 17, 1982

[30] Foreign Application Priority Data

Nov. 24, 1981 [GB] United Kingdom ............... 8135445

[51] Int. Cl.³ .......................................... A01B 59/043
[52] U.S. Cl. ............................ 280/460 A; 172/450; 280/461 A; 280/474
[58] Field of Search .......... 280/460 A, 460 R, 461 A, 280/456 A, 446 A, 479, 499, 474; 172/450

[56] References Cited

U.S. PATENT DOCUMENTS

| | | | |
|---|---|---|---|
| 2,935,147 | 5/1960 | Edman et al. | 172/450 |
| 3,312,478 | 4/1967 | Knaapi | 280/405 B |
| 3,709,304 | 1/1973 | Haupt | 172/450 |
| 3,888,316 | 6/1975 | Azzarello et al. | 172/450 |
| 3,910,355 | 10/1975 | Elfes et al. | 172/450 |

FOREIGN PATENT DOCUMENTS

| | | | |
|---|---|---|---|
| 250711 | 5/1963 | Australia | 280/460 A |
| 2836825 | 3/1980 | Fed. Rep. of Germany | 172/450 |

Primary Examiner—Joseph F. Peters, Jr.
Assistant Examiner—Mitchell J. Hill

[57] ABSTRACT

Agricultural tractor hitches sometimes employ sway blocks fixed to opposite sides of the tractor frame which can co-act slideably with two lower hitch links as these are pivoted by a power lift mechanism. The blocks prevent lateral movement of an implement attached to the lower links when in raised transport position and optionally when in lowered working position. To permit minor adjustment and compensation for wear in the co-action between the blocks and the lower links, pads are secured to the lower links and arranged to co-act slideably with the respective blocks, each pad being tapered lengthwise of its associated link and being adjustable in position lengthwise of its associated link.

5 Claims, 4 Drawing Figures

TRACTOR HITCHES

BACKGROUND OF INVENTION

The invention relates to a tractor hitch, and more particularly to a tractor hitch provided with so-called "sway blocks", that is to say with two members adapted to be secured to opposite sides of the rear end of a tractor frame and each having a working surface arranged to co-act slideably with the adjacent one of two lower hitch links capable of being pivotally raised and lowered by a power lift mechanism. The sway block members can usually be locked in two alternative positions in one of which their working surfaces are parallel to one another so that the lower hitch links make continuous contact with them in order that an implement attached to said links is stabilised centrally (that is to say prevented from swaying) both when in lowered working position and in raised transport position, and in the other of which their working surfaces converge upwardly so that the lower hitch links make contact with them only when raised in order that an implement attached to said links can float (or sway) laterally when in lowered working position but is stabilised centrally when in raised transport position.

The object of the present invention is to provide means for permitting minor adjustment and compensation for wear in the co-action between the sway blocks and the lower hitch links.

SUMMARY OF INVENTION

According to the invention, a tractor hitch has two sway blocks adapted to be secured to opposite sides of the rear end of a tractor frame and each having a working surface arranged to co-act slideably with a pad secured to the adjacent lower hitch link, the pad being tapered lengthwise of said link and being adjustable in position lengthwise of said link.

BRIEF DESCRIPTION OF DRAWINGS

A preferred embodiment of the invention will now be described, by way of example, with reference to the accompanying drawings of which.

DESCRIPTION OF PREFERRED EMBODIMENT

Figure 1:
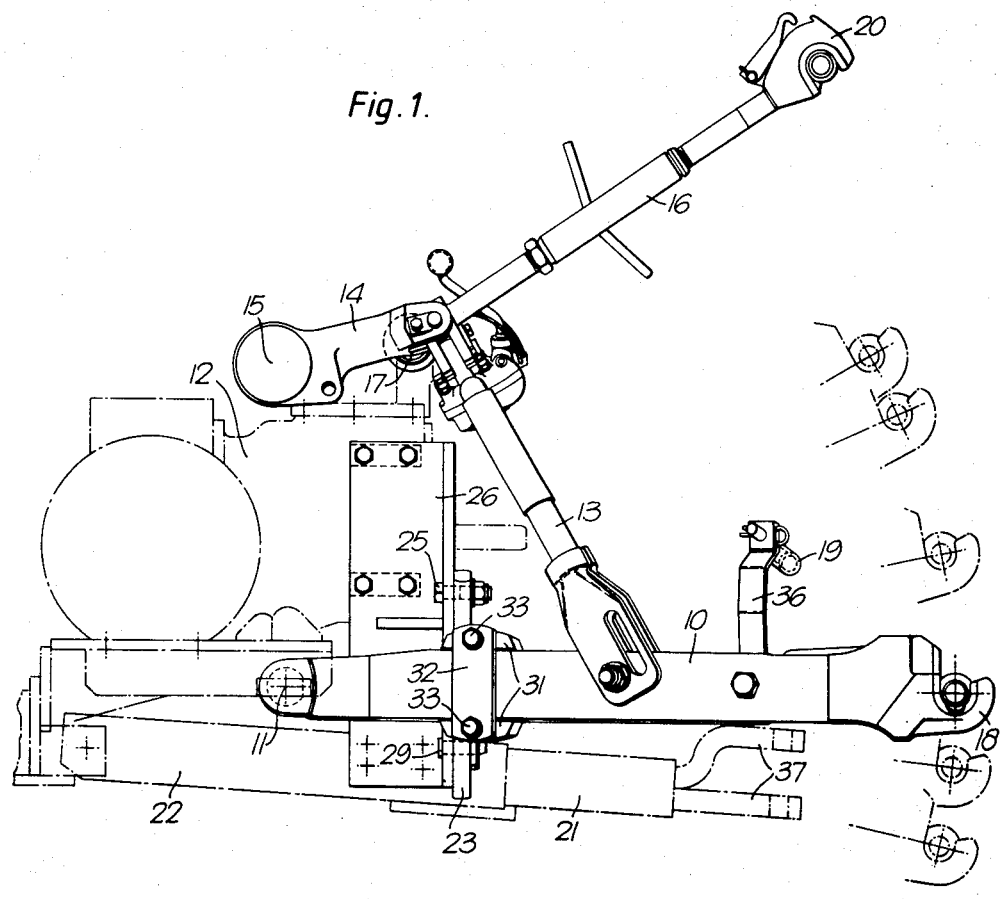
FIG. 1 is a side elevation of a hitch linkage mounted on the rear of a tractor.

Referring now to the drawings, a tractor hitch is of the wellknown kind comprising two laterally-spaced lower links 10 universally mounted at 11 on the rear end of a tractor frame 12 and capable of being raised and lowered by lift rods 13 connected to lift arm 14 secured to the respective ends of a rock-shaft 15 operated by a power lift mechanism housed within the tractor frame 12; and a central upper link 16 universally mounted at 17 on the rear end of said frame. The lower links 10 have known hook-type quick-hitch attachments 18 at their rear ends, and are urged apart pivotally about their front ends by means of a resilient link which inter-connects brackets 36 fixed to said links between their ends, the resilient link comprising a helical spring 19 deformed to a bowed shape when in operative position. The upper link 16 also has a hook-type quick-hitch attachment 20 at its rear end. A draw-bar 21 having a clevis 37 is connected to a sub-frame 22 secured to the tractor frame 12 beneath its rear end and is disposed centrally between the lower links 10. Two sway blocks 23 are disposed at opposite sides of the rear end of the tractor frame 12, inboard of the lower links 10, and have respective outwardly-facing plane working surfaces 24 referred to hereinafter. The sway-blocks 23 are pivotable about their upper ends and lockable in two alternative positions in one of which (see FIG. 3) their working surfaces 24 are parallel to one another and in the other of which (see FIG. 2) said surfaces diverge upwardly. To this end, each sway block 23 is pivotally connected near its upper end by a bolt 25 and self-locking nut to a bracket 26 secured to the tractor frame 12 and is provided near its lower end with two holes 27 and 28 either of which can be aligned, by pivoting the sway block 23 about the bolt 25, with a hole in the bracket 26 whereupon a pin 29 can be inserted through the aligned holes and secured by a linch pin 30 to lock the sway block 23 in the chosen position.

Figure 2:
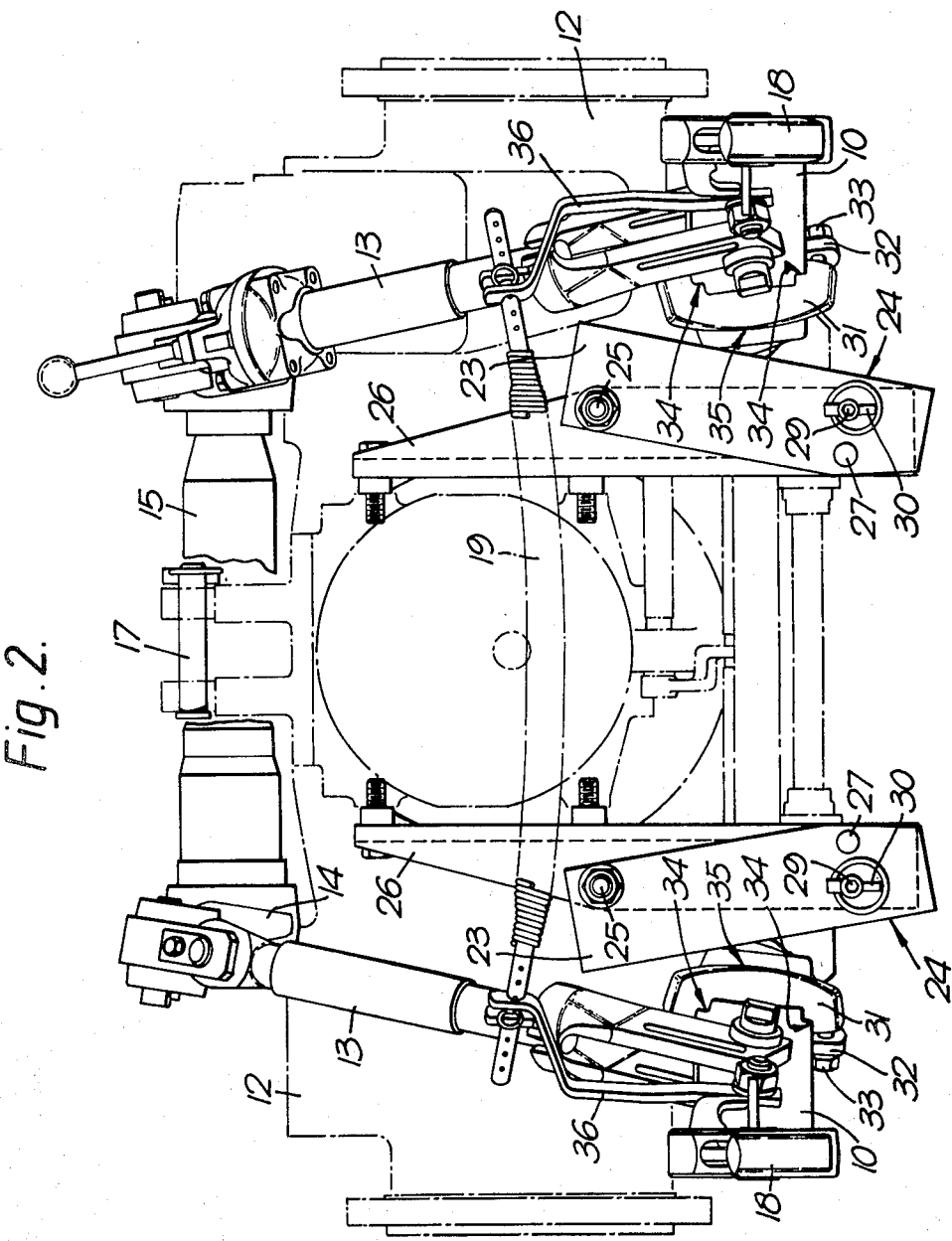
FIG. 2 is a rear elevation thereof.
Figure 3:
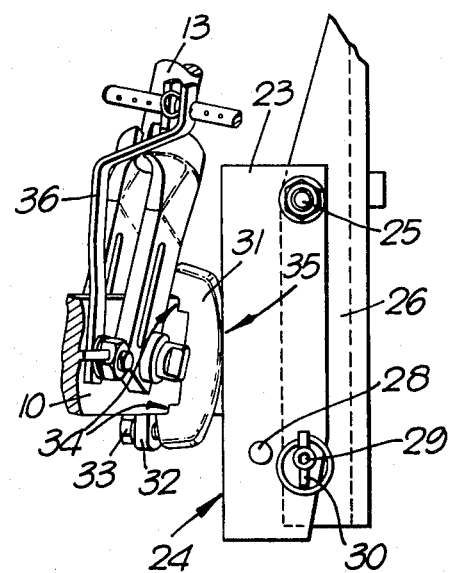
FIG. 3 shows part of FIG. 2 adjusted for a different mode of operation.
Figure 4:
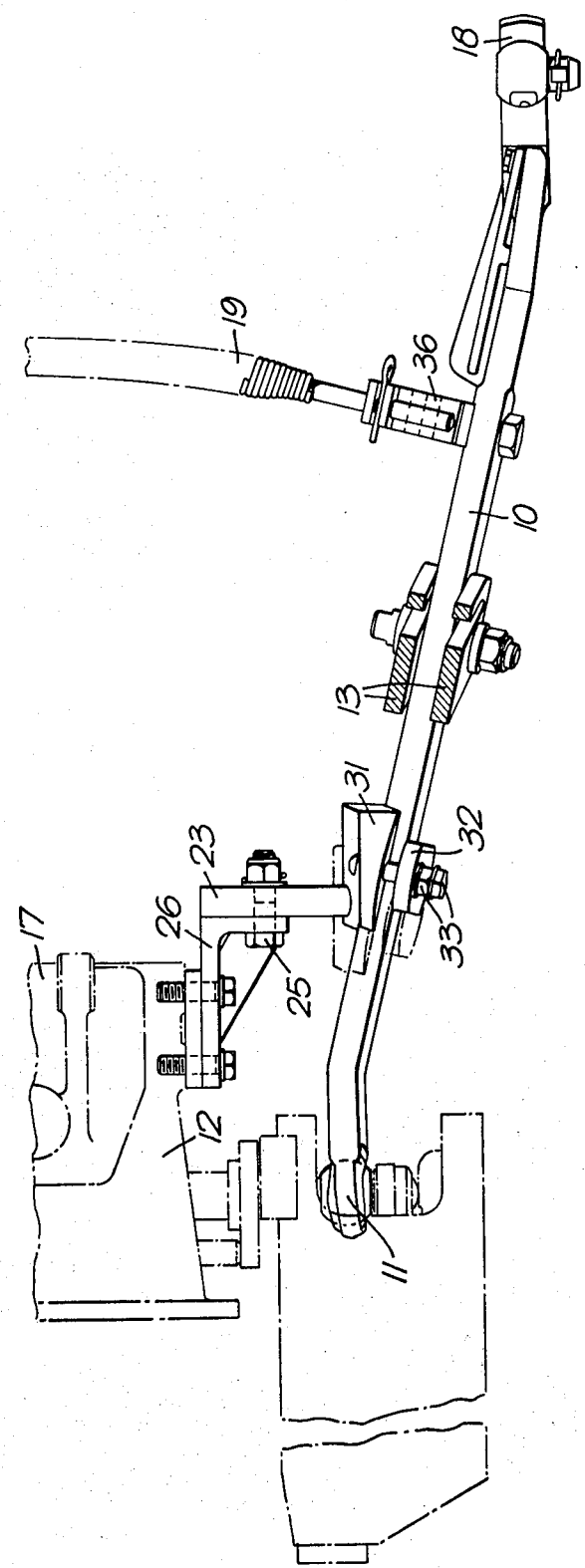
FIG. 4 is a plan view of one of the lower hitch links and adjacent parts of the tractor.

Two metal pads 31 are secured to the inner sides of the respective lower hitch links 10 in such a position that they can co-act slideable with the working surfaces 24 of the respective sway blocks 23. As shown in FIG. 4, each of the pads 31 is tapered lengthwise of its associated lower link 10 and is also adjustable in position length-wise of said link so as to permit minor adjustment and compensation for wear in the co-action between the sway blocks 23 and said pads. Each pad 31 is adjustably secured to the inner side of its associated lower link 10 by a clamping plate 32 disposed on the outer side of said link and two set-screws 33 disposed respectively above and below said link and each passing through a clearance hole in said plate and engaging a screw-threaded hole in said pad. As shown in FIGS. 2 and 3, the profile of each pad 31 normal to the length of its associated lower link 10 comprises two rightangled seats 34 arranged to receive respective upper and lower corners of the inner side of the cross-section of said link, and a curve 35 arranged to co-act slidably with the plane working surface 24 of the associated sway block 23.

The sway blocks 23 operate in a conventional manner as described in the opening paragraph of this specification, but the tapered shape and adjustable mounting of the pads 31 which co-act with the blocks 23 constitute a refinement of the design which permits minor adjustment and compensation for wear not hitherto achievable.

I claim:

1. A tractor hitch having two sway blocks adapted to be secured to opposite sides of the rear end of a tractor frame, each sway block having a single working surface arranged to co-act slideably with a pad secured to an adjacent lower hitch link, the pad being tapered lengthwise of said link and being adjustable in position lengthwise of said link, the sway blocks being pivotable in a common vertical plane which extends transversely of the tractor about respective axes at their upper ends, which axes extend longitudinally of the tractor, and said blocks being lockable in two alternative positions in said plane in one of which positions said working surfaces of said sway blocks are parallel to one another and in the other of which positions said working surfaces diverge upwardly.

2. A tractor hitch according to claim 1 wherein each pad is adjustably secured to one side of its associated lower hitch link by a clamping plate disposed on the other side of said link and respective bolts interconnecting said pad and said link above and below said link.

3. A tractor hitch according to claim 1 or claim 2, wherein the profile of each pad normal to the length of its associated lower hitch link comprises two right-angled seats arranged to receive respective upper and lower corners of one side of the cross-section of said link, and a curve arranged to co-act slideably with the working surface of the associated sway block.

4. A tractor hitch according to claim 1, wherein each sway block is pivotally connected near its upper end to a bracket adapted to be secured to the tractor frame, and is provided near its lower end with two holes either of which can be aligned, by pivoting the sway block, with a hole in the bracket whereupon a pin can be inserted through the aligned holes to lock the sway block in the chosen position.

5. A tractor hitch according to claim 1 or claim 4, wherein the lower hitch links are urged apart pivotally about their front ends by resilient means and have quick-hitch attachments at their rear ends.

* * * * *